Figure 1:
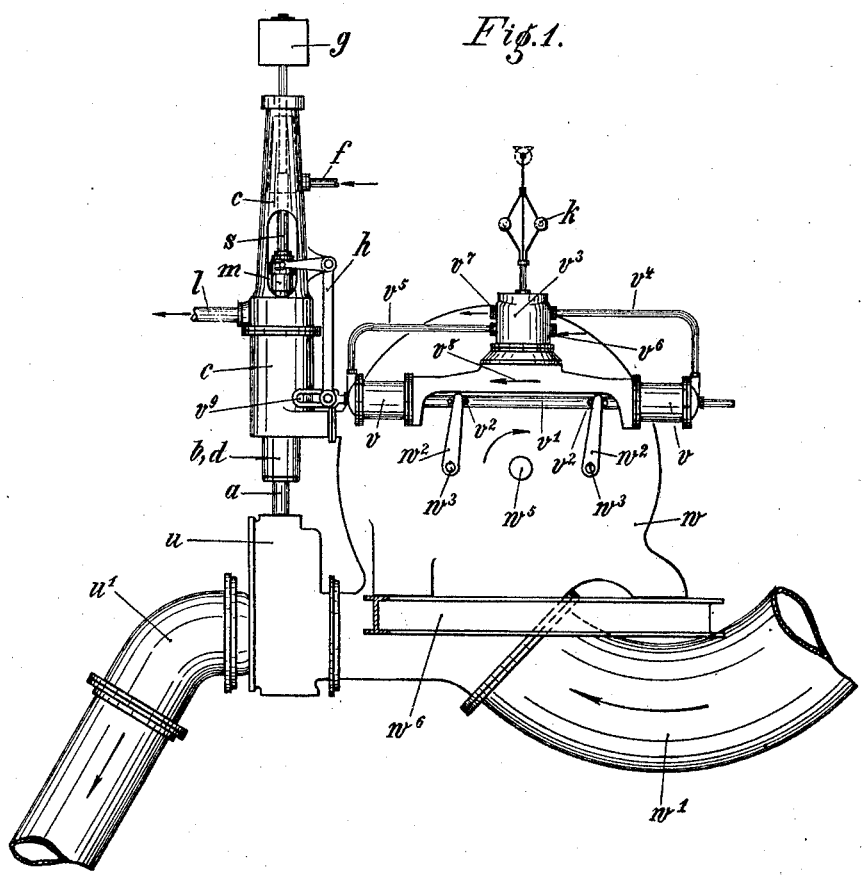

V. GELPKE.
TURBINE.
APPLICATION FILED MAR. 28, 1911.

1,002,669.

Patented Sept. 5, 1911.
2 SHEETS—SHEET 1.

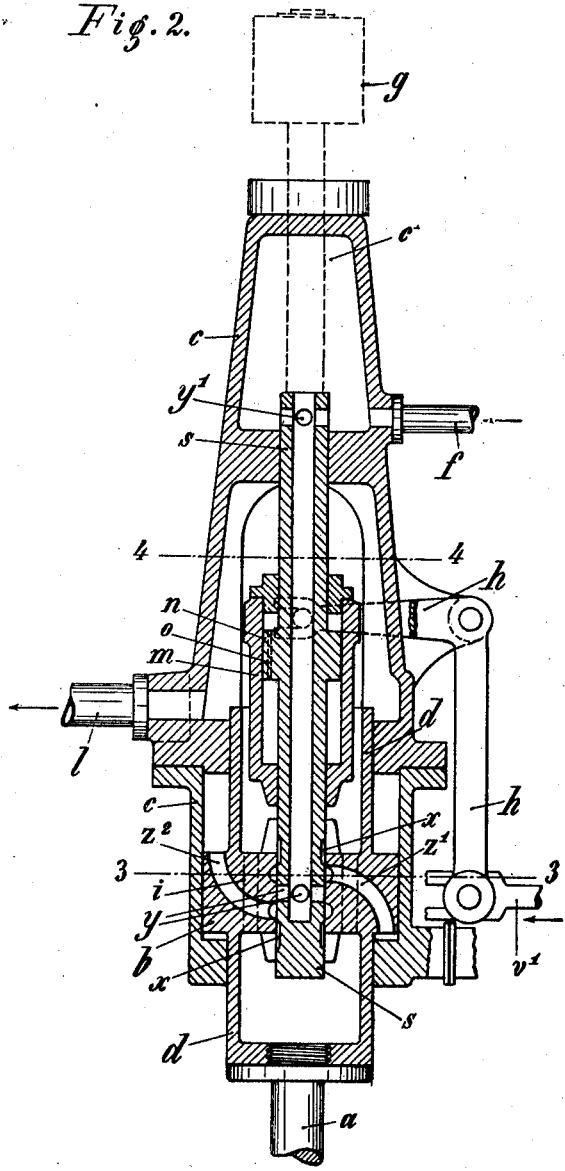

UNITED STATES PATENT OFFICE.

VICTOR GELPKE, OF BRUNSWICK, GERMANY.

TURBINE.

1,002,669.

Specification of Letters Patent.  Patented Sept. 5, 1911.

Application filed March 28, 1911. Serial No. 617,397.

*To all whom it may concern:*

Be it known that I, VICTOR GELPKE, engineer, a subject of the Republic of Switzerland, Europe, residing at 5 Schleinitzstrasse, Brunswick, Germany, have invented certain new and useful Improvements in Turbines, of which the following is a specification.

My invention relates to improvements in turbines, and more particularly to turbines of that class in which for the purpose of avoiding blows of the water a by-passage is provided through which the water flows when the water supply to the turbine has been shut off, and which is automatically and gradually closed.

My invention relates more particularly to the apparatus for controlling the valve of the said by-passage, which controlling apparatus as heretofore constructed consists of a controlling member moved by the working cylinder of the speed regulator which causes a pressure fluid to act on a floating piston.

For the purpose of explaining the invention more in detail several examples embodying the same have been shown in the accompanying drawings in which the same letters of reference have been used in all the views to indicate corresponding parts.

In said drawings—Figure 1, is a diagrammatical side view showing the turbine, its admission pipe, regulating device and the valve controlling the by-passage, Fig. 2, is a vertical section of the apparatus for controlling the valve of the by-passage, Fig. 3, is a horizontal section taken on the line 3—3 of Fig. 2, Fig. 4, is a section taken on the line 4—4 of Fig. 2.

Before describing the part of the machine to which my invention more particularly relates, I shall describe in a general way the turbine and the parts directly connected therewith, in order that the operation of the controlling apparatus may more readily be understood.

The turbine $w$ is mounted on a frame $w^6$, and the water is supplied thereto through a tube $w^1$. The turbine is provided with a by-passage $u^1$ which is normally closed by a valve disposed within a valve chamber $u$. For the purpose of avoiding the impact of the water the said valve is opened whenever the gates or guiding buckets of the turbine are suddenly closed by the automatic controlling mechanism. The said gates are set in the ordinary way by means of a motor which, in the example, shown in Fig. 1, consists of two pressure cylinders $v$ each of which is provided with a piston adapted to be acted upon by a pressure fluid from one side only. The said pistons are mounted on the same piston rod $v^1$, and the latter is provided with lugs $v^2$ which, upon the axial displacement of the piston rod, are adapted to carry along cranks $w^2$ mounted on shafts $w^3$. The latter pass through the casing of the turbine and into the inner part thereof where they are connected with the gates in such a way that the latter are closed or opened by the displacement of the piston rod $v^1$, as is known in the art. The movement of the motor $v$, $v$ toward the right or left is effected in the usual way by means of a controlling valve $v^3$ (see German Patent No. 216,486) which is connected by pipes $v^4$ and $v^5$ respectively with the cylinders $v$, and which is controlled by a speed governor $k$ driven by the turbine shaft $w^5$, which governor causes a pressure liquid within the valve chamber $v^3$ to act either on the right hand cylinder or on the left hand cylinder $v$. The said pressure fluid is taken from a suitable storing receptacle and is admitted to the valve $v^3$ through an inlet $v^6$ and escapes therefrom through an outlet $v^7$. These parts are well known to those skilled in the art and therefore need no detailed description. The closing direction, or the direction in which the piston rod $v^1$ is moved for stopping the turbine, has been indicated by an arrow $v^8$. When the turbine is thus stopped, the slide valve controlling the by-passage $u^1$ is automatically opened in order to avoid the impact of the water, and the gradual closing operations of the slide valve controlling the by-passage is effected by means of a controlling apparatus which is located within a casing $c$. As appears from Fig. 1, the said apparatus carries the stem $a$ of the slide valve for controlling the by-passage, and it is connected, for example by means of a bell crank lever $h$, with a left hand extension of the piston rod $v^1$. As shown the said lever $h$ engages with a pin into a slot $v^9$ of the extension of the piston rod, in order that, when suddenly opening the gates of the turbine by moving the piston rod $v^1$ in a direction opposite to that of the arrow $v^8$ the controlling apparatus $c$ for gradually closing the valve within the by-passage is not affected.

My invention relates more particularly to the controlling apparatus $c$ for the slide valve of the by-passage $u^1$, and an example embodying the same has been shown in Figs. 2 to 4. The rod $a$ which is connected to the slide or other valve for controlling the by-passage is secured to a piston $b$ which reciprocates within the casing $c$. The piston rod of the said piston is made in the form of a hollow body $d$, and it has a close fit within the casing $c$. The rod $d$ is closed at its bottom and open at its top, and the piston $b$ is provided with a suitable number of bores $i$ (Fig. 3) through which the upper and lower chambers of the hollow body $d$ communicate with each other. Besides the piston $b$ is formed with a central bore and with passages $z^1$ and $z^2$ which connect the central bore with the opposite faces of the piston. Within the central bore of the piston $b$ a hollow controlling rod $s$ is movable which, as appears from Fig. 2, is provided near its lower end with transverse bores $y$ and grooves $x$, and at its upper end with bores $y^1$. If necessary the said rod can be weighted by a weight $g$. The controlling rod $s$ is formed with an enlarged portion forming a piston $n$ and having a bore $o$. The active faces of the said piston have the same cross-sectional area at both sides, and the piston moves within a sleeve $m$ tightly inclosing the rod $s$. By means of the bell crank lever $h$ the sleeve $m$ is connected with the piston rod $v^1$ of the cylinders $v$ (Fig. 1) which control the admission to the turbine, or with other elements connected with the controlling mechanism of the turbine, the connection being made in such a way, that the sleeve $m$ is moved only when the admission to the turbine is closed, or the piston rod $v^1$ is moved in the direction of the arrow shown in Fig. 2, while it is not moved upon the opening operation of the said admission devices. Preferably an elastic member, such for example as a buffer, is interposed between the rod $v^1$ and the lever $h$. Within the upper part of the casing $c$ there is a special chamber $c^1$ (Fig. 2) into which the rod $s$ extends, and to which a pressure fluid such for example as oil can be supplied through a pipe $f$. If for the purpose of stopping the turbine the rod $v^1$ is moved in the direction of the arrow shown in Fig. 2, the sleeve $m$ which is filled with the pressure fluid is moved upward, and it carries along the piston $n$ and the rod $s$, because the liquid above the piston $n$ can not rapidly enough escape through the fine bore $o$. Thereupon the rod $s$ is gradually returned into its lowermost position by its weight or by fluid pressure. When the rod $s$ is thus moved upward, the pressure fluid passes from the bore of the rod $s$ through the bores $y$ into the passage $z^1$ and below the piston $b$, so that the latter, the hollow body $d$ and the rod $a$ are forced upward. The pressure liquid which is above the piston $b$ is forced through the passage $z^2$, the groove $x$ and the bores $i$ into the chamber of the hollow body $d$ provided above the piston $b$ and it is discharged from the apparatus through an outlet tube $l$. Upon the downward movement the operations described are performed in the opposite sense.

As compared to similar apparatus in which the opening of the by-passage depends on the position of the speed governor my improved controlling apparatus is advantageous, because not more of the pressure fluid is used up, than what corresponds to the active cross-sectional area of the piston, and that not only pressure water, but any desired liquid can be used as a pressure fluid.

I claim herein as my invention:

1. The combination with a motor, a fluid supply thereto, a by-passage adapted to be thrown into communication with said fluid supply, means for normally breaking communication between said fluid supply and by-passage, and controlling means for said fluid supply, of a cylinder, a piston movable therein and operatively connected with said means for breaking communication between said fluid supply and by-passage, a hollow rod adapted to be alternately thrown into communication with the hollow of said cylinder at the side of the piston for moving the same into position to establish communication between the said fluid supply to the motor and by-passage and at the side of the piston for returning the same into normal position, means to supply a pressure fluid to the hollow of said rod, means actuated by said controlling means for the fluid supply and operative when the fluid supply is shut off to establish communication between the hollow of the rod and the cylinder on the side of the piston for moving the piston into position to establish communication between said fluid supply and by-passage, and gradually operative means to establish communication between the hollow of the rod and the cylinder at the side of the piston for returning the piston into normal position.

2. The combination with a motor, a fluid supply thereto, a by-passage adapted to be thrown into communication with said fluid supply, means for normally breaking communication between said fluid supply and by-passage, and a governor controlling said fluid supply, of a cylinder, a piston movable therein and operatively connected with said means for breaking communication between said fluid supply and by-passage, a hollow rod adapted to be thrown into communication with the hollow of said cylinder at one side of the piston, means to supply a pressure medium to the hollow of said rod, means directly operated by said governor and operative when the fluid supply is shut off to establish communication between the hollow of the rod and the hollow of the cylinder on the said side of the piston and to move said piston into position for throwing said fluid supply and by-passage into communication with each other, and means to return said piston into normal position.

In testimony whereof I have hereunto set my hand in presence of two subscribing witnesses.

VICTOR GELPKE.

Witnesses:
 WILHELM LEHRKE,
 KARL MUNDT.